United States Patent
Shimomura

(10) Patent No.: US 8,397,872 B2
(45) Date of Patent: Mar. 19, 2013

(54) LUBRICANT RECOVERY DEVICE

(75) Inventor: Ryoichi Shimomura, Aichi (JP)

(73) Assignee: Okuma Corporation, Aichi (JP)

( * ) Notice: Subject to any disclaimer, the term of this patent is extended or adjusted under 35 U.S.C. 154(b) by 654 days.

(21) Appl. No.: 12/379,745

(22) Filed: Feb. 27, 2009

(65) Prior Publication Data

US 2009/0242330 A1   Oct. 1, 2009

(30) Foreign Application Priority Data

Mar. 31, 2008 (JP) .................................. 2008-91852
Sep. 12, 2008 (JP) ................................ 2008-234284

(51) Int. Cl.
*F01M 1/12* (2006.01)

(52) U.S. Cl. ..................................................... 184/6.26

(58) Field of Classification Search ................ 184/6.14, 184/6.18, 6.26, 7.1
See application file for complete search history.

(56) References Cited

U.S. PATENT DOCUMENTS

| | | | | |
|---|---|---|---|---|
| 3,095,063 A | * | 6/1963 | Eskenazi | 184/6.12 |
| 4,448,285 A | * | 5/1984 | Burgbacher | 184/55.2 |
| 5,881,840 A | * | 3/1999 | Mize | 184/1.5 |
| 6,321,874 B1 | * | 11/2001 | Miyamoto | 184/1.5 |
| 6,860,366 B2 | * | 3/2005 | Hori et al. | 184/52 |
| 6,991,574 B2 | * | 1/2006 | Martin, III | 475/159 |
| 7,155,825 B2 | * | 1/2007 | Lind | 29/898.02 |
| 7,467,689 B1 | * | 12/2008 | Batten et al. | 184/1.5 |
| 2009/0242330 A1 | * | 10/2009 | Shimomura | 184/6.26 |

FOREIGN PATENT DOCUMENTS

| | | |
|---|---|---|
| JP | 2001-090739 | 4/2001 |
| JP | 2002-018676 | 1/2002 |
| JP | 2004-162872 | 6/2004 |

* cited by examiner

*Primary Examiner* — Michael Mansen
*Assistant Examiner* — Mark K Buse
(74) *Attorney, Agent, or Firm* — Jacobson Holman PLLC

(57) ABSTRACT

In a housing 13, an air discharge hole 41 and a suction pipe 51 are arranged vertically in parallel and are located outward with respect to a bearing 12 that supports a vertical main spindle 11. A communication hole 43 connects between a space formed below the bearing 12 and an intermediate portion of the air discharge hole 41 in a height direction. A bottom end of the air discharge hole 41 and that of the suction pipe 51 communicate with an oil reservoir 45. Lubricant in the oil reservoir 45 is sucked through the suction pipe 51 and is recovered at a position outside the housing 13.

7 Claims, 2 Drawing Sheets

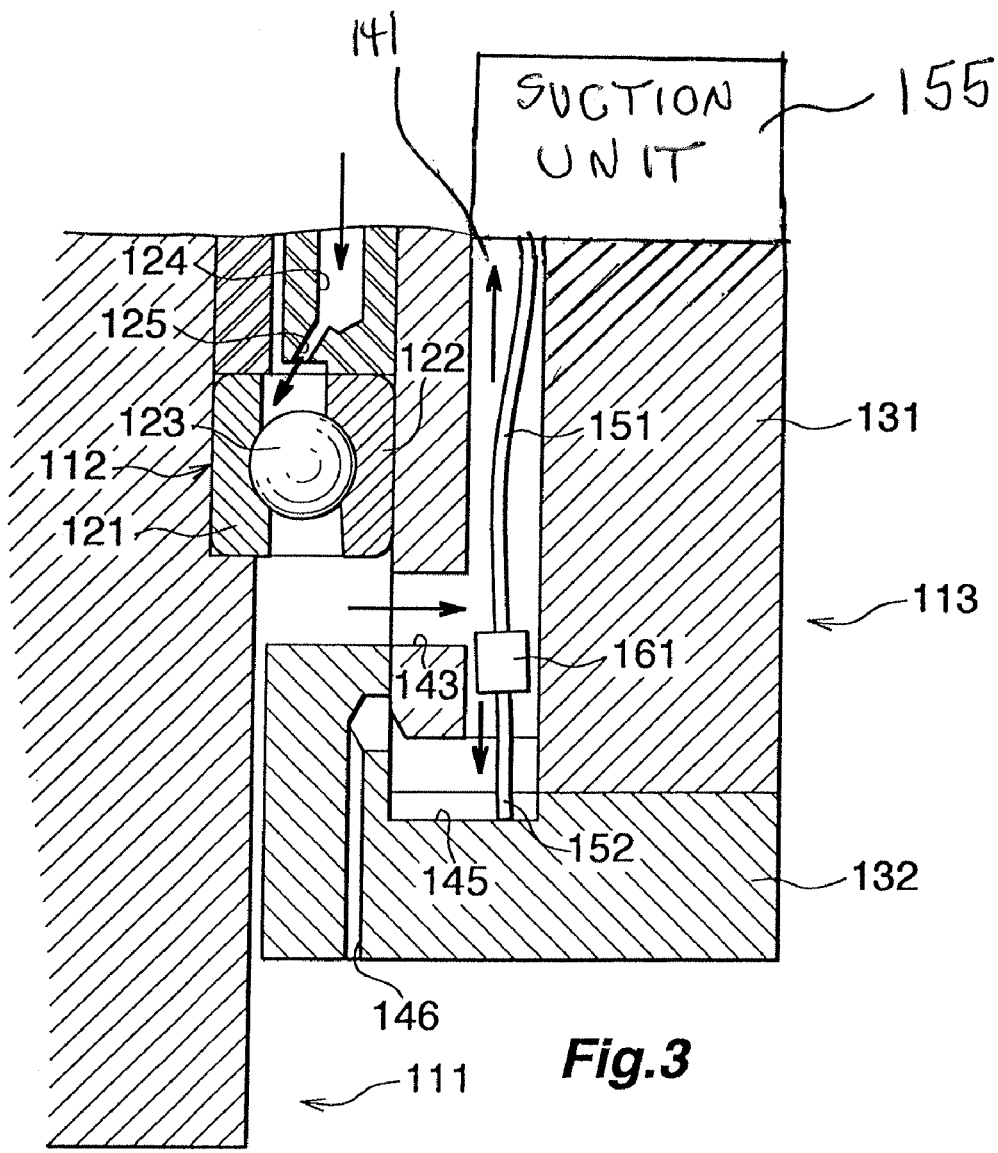
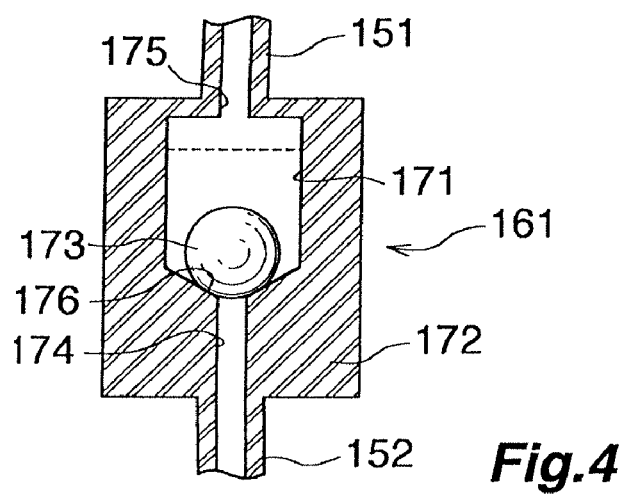

LUBRICANT RECOVERY DEVICE

This application has a priority of Japanese no. 2008-91852 filed Mar. 31, 2008, and a priority of Japanese no. 2008-234284 filed Sep. 12, 2008, hereby incorporated by reference.

BACKGROUND OF THE INVENTION

The present invention relates to a lubricant recovery device. For example, the present invention relates to a device in a spindle device of a machine tool having a vertical main spindle. This device recovers lubricant which is supplied together with carrier air to one side of a bearing rotatably supporting a main spindle in a fixed housing.

For example, a bearing that rotatably supports a main spindle such as a machining center in a fixed housing has a high dn value in order to satisfy a demand for enhancement of a rotational speed of the main spindle. As a method for lubricating the bearing, therefore, oil air lubrication or oil mist lubrication is frequently adopted in place of grease lubrication. Specifically, lubricant which is relatively low in viscosity is supplied from an external source to one side of the bearing through use of carrier air. The oil air lubrication and the oil mist lubrication are superior to the grease lubrication in the following point. That is, since new lubricant is constantly supplied from the external source to the bearing, a rolling lifetime of the bearing does not depend on a lifetime of the lubricant.

In the case of adopting the oil air lubrication or the oil mist lubrication, however, the lubricant supplied to the bearing must be discharged.

As a conventional device for discharging lubricant supplied to a bearing, for example, JP-A-2001-090739 discloses a device having the following configuration. That is, a fixed housing has a through air channel that extends vertically, and an oil discharge passage. The oil discharge passage has a first end opened at an inner surface of the fixed housing on an opposite side to a lubricant supply side of a bearing, and a second end opened at an inner surface of the air channel. Herein, when air is fed from an upper opening of the air channel, lubricant is supplied to the bearing by means of flow of the air in the air channel and then is fed into the air channel through the oil discharge passage. Thereafter, the lubricant is discharged from a lower opening of the air channel in conjunction with the air flow.

In the case of using the device disclosed in JP-A-2001-090739, occasionally, the spent lubricant which is discharged from the lower opening of the air channel drops and adheres to a workpiece. For example, in a case where working is performed without using a cutting fluid, such as working for a mold assembly, if lubricant adheres to a workpiece, chips are attached to the workpiece due to the lubricant. Consequently, there is a possibility that a surface of the workpiece is damaged in finishing.

Moreover, JP-A-2002-018676 discloses a device having the following configuration. That is, a lubricant pan is provided at a bottom end surface of a fixed housing so as to receive lubricant discharged from a lower opening of an air channel. Moreover, a lubricant discharge pipe has a first end which is located in the lubricant pan, and a second end which extends to a lubricant discharge position. Further, an air pipe is provided for allowing air to pass therethrough. Herein, the lubricant discharge pipe and the air pipe are coupled to each other such that a flowing direction of the lubricant is equal to that of the air. When the air is supplied to the air pipe at high speed, the lubricant in the lubricant pan is discharged by suction.

In the case of using the device disclosed in JP-A-2002-018676, the lubricant pan, the lubricant discharge pipe, the air pipe and the like must be disposed around a tip end of a main spindle. In order to avoid interference with a workpiece, however, there is a possibility that the disposition of each component becomes considerably difficult.

Further, JP-A-2004-162872 discloses a device having the following configuration. That is, a housing has a carrier air discharge passage, a lubricant discharge passage and a dropping lubricant collecting passage. The carrier air discharge passage is formed for discharging carrier air from one side of a bearing. The lubricant discharge passage has a discharging air inlet and a discharging air outlet. The dropping lubricant collecting passage has an upper opening which communicates with the carrier air discharge passage and extends downward, and a lower opening which communicates with the lubricant discharge passage. Herein, a valve body is provided at a portion below the dropping lubricant collecting passage in the housing. The valve body moves between a first position and a second position such that the lower opening of the dropping lubricant collecting passage is opened and closed.

In the case of using the device disclosed in JP-A-2004-162872, working for the position where the valve body is provided, working for the lubricant discharging air inlet, and working for the lubricant discharging air outlet must be performed. Further, the device requires a larger number of constituent components.

SUMMARY OF THE INVENTION

The present invention has been devised to solve the problems described above. An object of the present invention is to provide a lubricant recovery device that prevents dropping lubricant from adhering to a workpiece and requires no extra components for collecting the lubricant in an area around a tip end of a main spindle even in a case where the lubricant recovery device is applied to a spindle device of a machine tool. Further, this lubricant recovery device can be reduced in portion to be subjected to working and can be reduced in number of constituent components.

The lubricant recovery device according to the present invention includes: a vertical main spindle; a bearing that supports the main spindle; an oil reservoir that communicates with a space formed below the bearing; a housing that has an air discharge passage for discharging air in oil air or oil mist passing through the bearing and a lubricant discharge passage for discharging lubricant in the oil air or the oil mist, the air discharge passage and the lubricant discharge passage being formed independently of each other so as to extend upward from the oil reservoir; and a suction unit that sucks the lubricant in the oil reservoir through the lubricant discharge passage such that the lubricant is recovered at a position outside the housing.

In the lubricant recovery device according to the present invention, the lubricant which is discharged together with the air from the bearing in the state of oil air or oil mist is fed into the air discharge passage. In the air discharge passage, the lubricant is liquefied and then is retained in the oil reservoir. The liquefied lubricant in the oil reservoir is sucked by the suction unit. Thus, the lubricant is recovered. Accordingly, the lubricant discharged from the bearing never drops in the vicinity of the main spindle and, therefore, never adheres to a workpiece. Further, the lubricant recovery device according to the present invention eliminates a disadvantage that a working range is restricted due to disposition of a component for collecting spent lubricant in an area around a tip end of a main spindle. In addition, the lubricant recovery device according to the present invention does not require the valve body disclosed in JP-A-2004-162872 in order to prevent the lubricant discharging air from flowing into the bearing. Therefore, the lubricant recovery device according to the present invention allows recovery of spent lubricant with relatively simple working and reduced components in number.

Further, the air discharge passage is an air discharge hole extending outward with respect to the bearing, and the lubricant discharge passage is a lubricant discharge hole extending in parallel with the air discharge hole. Thus, each of the air discharge passage and the lubricant discharge path can be formed with a simple structure. In addition, the lubricant passing through the air discharge hole can be liquefied efficiently.

Moreover, a suction pipe is inserted into the lubricant discharge hole, and a bottom end of the suction pipe is located in the oil reservoir. Thus, even when the lubricant in the oil reservoir is small in amount, the lubricant recovery device according to the present invention can suck this lubricant.

In addition to the air discharge hole and the lubricant discharge hole, further, the air discharge passage may be an air discharge hole extending outward with respect to the bearing, and the lubricant discharge passage may be a lubricant discharge pipe inserted into the air discharge hole and having a bottom end located in the oil reservoir.

Thus, each of the air discharge passage and the lubricant discharge passage can be formed with a simple configuration. In addition, a space for forming the air discharge passage and a space for forming the lubricant discharge passage can be saved.

Moreover, a check valve is provided on the lubricant discharge passage. This configuration prevents backflow of the lubricant in the lubricant discharge passage.

Further, the oil reservoir has a lubricant overflow port. This configuration prevents overflow of the lubricant in the bearing.

BRIEF DESCRIPTION OF THE DRAWINGS

FIG. 3 is a vertical sectional view showing a lubricant recovery device according to a second embodiment of the present invention.

FIG. 4 is a sectional view showing a check valve of the lubricant recovery device in detail.

DETAILED DESCRIPTION OF THE PREFERRED EMBODIMENTS

With reference to the drawings, hereinafter, description will be given of preferred embodiments of the present invention.

First Embodiment

Figure 1:
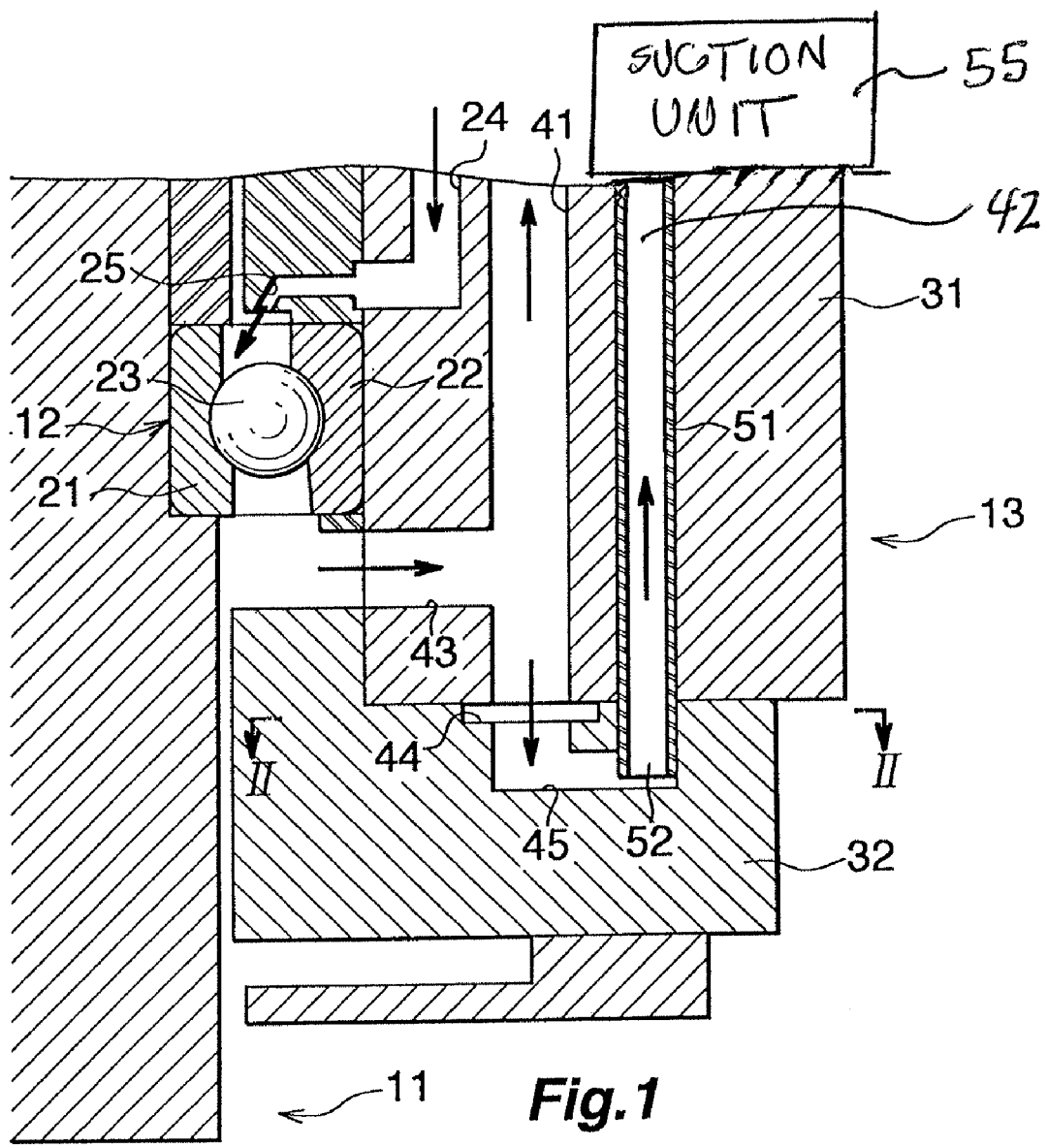
FIG. 1 a vertical sectional view showing a lubricant recovery device according to a first embodiment of the present invention.
Figure 2:
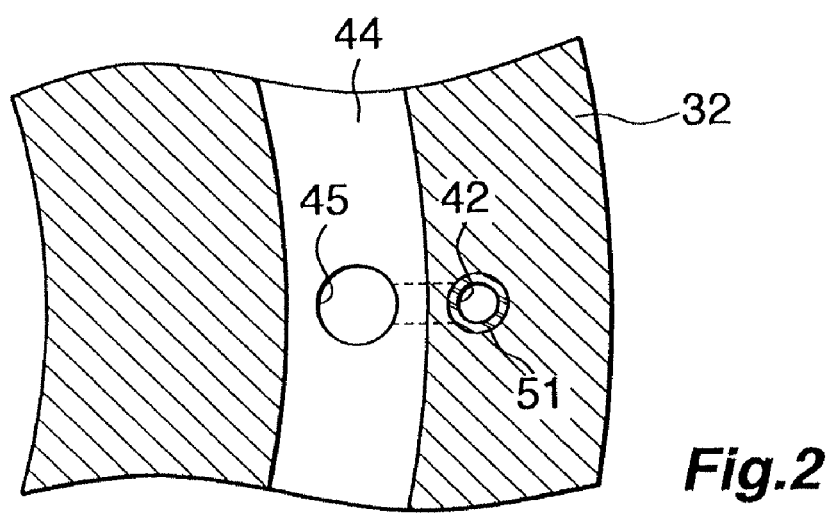
FIG. 2 is a sectional view taken along a line II-II shown in FIG. 1.

With reference to FIG. 1, a lubricant recovery device according to a first embodiment includes a vertical main spindle 11, a ball bearing 12 which supports the main spindle 11, and a cylindrical housing 13 with which the main spindle 11 and the bearing 12 are surrounded.

The bearing 12 includes an inner ring 21, an outer ring 22, and a rolling element 23 which is interposed between the two rings 21 and 22.

The housing 13 includes an outer housing 31 which is located outside the bearing 12, and a lower housing 32 which is located below the bearing 12. Herein, a bottom end surface of the outer housing 31 is brought into close contact with a top end surface of the lower housing 32.

The outer housing 31 has a lubricant supply hole 24 which is higher in level than the bearing 12. Herein, a nozzle 25 is provided at a tip end of the lubricant supply hole 24 so as to face a space formed between the inner ring 21 and the outer ring 22 from above.

The outer housing 31 also has an air discharge hole 41 and a lubricant discharge hole 42 which are arranged vertically in parallel. The air discharge hole 41 and the lubricant discharge hole 42 are located outward with respect to the bearing 12. A communication hole 43 connects between a space formed below the bearing 12 and an intermediate portion of the air discharge hole 41 in a height direction. An annular oil collecting groove 44 is formed on the top end surface of the lower housing 32. Herein, the oil collecting groove 44 communicates with a bottom end of the air discharge hole 41 and extends along a circumference about an axial line of the main spindle 11. The bottom end of the air discharge hole 41 and that of the lubricant discharge hole 42 communicate with an oil reservoir 45 through the oil collecting groove 44. FIG. 1 shows one air discharge hole 41; however, a plurality of air discharge holes 41 may be formed in this embodiment. In such a case, bottom ends of the respective air discharge holes 41 communicate with the oil collecting groove 44. There is no necessity that the oil collecting groove 44 is formed if the number of air discharge holes 41 is one.

A suction pipe 51 is inserted into the lubricant discharge hole 42. A bottom end of the suction pipe 51 serves as an admission portion 52 which is located in the oil reservoir 45. This admission portion 52 allows suction of lubricant in the vicinity of a bottom surface of the oil reservoir 45. A top end of the suction pipe 51 is connected to a suction unit (not shown) 55.

When lubricant is supplied together with carrier air to the lubricant supply hole 24, the nozzle 25 sprays the lubricant in a state of oil mist or oil air onto the bearing 12. Then, the lubricant passes through the bearing 12 and is fed into the air discharge hole 41 through the communication hole 43. The air in the air discharge hole 41 is discharged in a state of ascending current from a top end of the air discharge hole 41. In the air discharge hole 41, on the other hand, the lubricant contained in the air partly adheres to an inner wall of the air discharge hole 41. Then, the lubricant is liquefied and drops. The liquefied lubricant is received by the oil collecting groove 44 and is retained in the oil reservoir 45. The lubricant in the oil reservoir 45 is sucked through the suction pipe 51 and is recovered at a position outside the housing 13.

The recovery of the lubricant is performed each time the lubricant in a predetermined amount is retained in the oil reservoir 45. The amount of the lubricant retained in the oil reservoir 45 can be predicted based on an operating time of the main spindle 11, an amount and an interval of supply of the lubricant, a count of the bearing 12, and the like. For example, an operation controller (not shown) of a spindle device monitors the operating time of the main spindle 11 in order that the lubricant in the oil reservoir 45 is sucked and recovered each time the lubricant in a predetermined amount is retained in the oil reservoir 45. This configuration allows suppression of an amount of air to be used for suction at minimum.

Second Embodiment

With reference to FIG. 3, a lubricant recovery device according to a second embodiment includes a vertical main spindle 111, a ball bearing 112 which supports the main spindle 111, and a cylindrical housing 113 with which the main spindle 111 and the bearing 112 are surrounded.

The bearing 112 includes an inner ring 121, an outer ring 122, and a rolling element 123 which is interposed between the two rings 121 and 122.

The housing 113 includes an outer housing 131 which is located outside the bearing 112, and a lower housing 132 which is located below the bearing 112. Herein, a bottom end surface of the outer housing 131 is brought into close contact with a top end surface of the lower housing 132.

The outer housing 131 has a lubricant supply hole 124 which is higher in level than the bearing 112. Herein, a nozzle 125 is provided at a tip end of the lubricant supply hole 124 so as to face a space formed between the inner ring 121 and the outer ring 122 from above.

The outer housing 131 also has a vertical air discharge hole 141 which is located outward with respect to the bearing 112. A communication hole 143 connects between a space formed below the bearing 112 and a lower portion of the air discharge hole 141 in a height direction. An oil reservoir 145 is formed at a bottom end of the air discharge hole 141. A lubricant overflow port 146 extends downward from an upper sidewall of the oil reservoir 145. A bottom end of the lubricant overflow port 146 is opened at a bottom end of the lower housing 132.

A lubricant discharge pipe 151 is inserted into the air discharge hole 141. A top end of the lubricant discharge pipe 151 is connected to a suction unit (not shown) 155. On the other hand, a bottom end of the lubricant discharge pipe 151 serves as an admission portion 152 which is located in the oil reservoir 145. A check valve 161 is provided immediately above the admission portion 152.

As shown in FIG. 4 in detail, the check valve 161 includes a valve box 172 which has a valve chamber 171, and a ball-shaped valve body 173 which is housed in the valve chamber 171. Herein, an inlet port 174 extends downward from a bottom side of the valve chamber 171 while an outlet port 175 extends upward from a top side of the valve chamber 171. A valve seat 176 is formed at an upper edge of the inlet port 174 to come into close contact with the valve body 173 from below.

In operation of the main spindle 111, when lubricant is supplied together with carrier air to the lubricant supply hole 124, the nozzle 125 sprays the lubricant in a state of oil mist or oil air onto the bearing 112. Then, the lubricant passes through the bearing 112 and is fed into the air discharge hole 141 through the communication hole 143. The air in the air discharge hole 141 is discharged in a state of ascending current from a top end of the air discharge hole 141. In the air discharge hole 141, on the other hand, the lubricant contained in the air partly adheres to an inner wall of the air discharge hole 141. Then, the lubricant is liquefied and drops. The liquefied lubricant is retained in the oil reservoir 145.

In a case where the lubricant is sucked through the lubricant discharge pipe 151, a negative pressure is generated in the lubricant discharge pipe 151. Thus, the valve body 173 is lifted up and the valve seat 176 is opened. Then, the inlet port 174 communicates with the outlet port 175. The lubricant in the oil reservoir 145 is sucked through the lubricant discharge pipe 151 and is recovered at a position outside the housing 113.

When the suction through the lubricant discharge pipe 151 is halted by a halt of the operation of the main spindle 111 or a halt of power supply to the machine tool, the pressure in the lubricant discharge pipe 151 returns to the atmospheric pressure, and the valve body 173 is seated on the valve seat 176. Thus, the communication between the inlet port 174 and the outlet port 175 is interrupted, leading to prevention of backflow of the lubricant in the lubricant discharge pipe 151.

In the operation of the main spindle 111, on the other hand, no lubricant is discharged through the lubricant discharge pipe 151 if the valve body 173 is continuously seated on the valve seat 176. In this case, the lubricant disadvantageously flows toward the bearing 112, resulting in abnormal heat production in the bearing 112 and seizing up of the bearing 112. In order to avoid this disadvantage, the lubricant is discharged urgently from the oil reservoir 145 through the lubricant overflow port 146.

Herein, the check valve 161 described in the second embodiment may be provided to the suction pipe 51 described in the first embodiment, so that the lubricant recovery device according to the first embodiment can join the advantage by the check valve 161, as in the case of the lubricant recovery device according to the second embodiment. Similarly, the lubricant overflow port 146 described in the second embodiment may be provided to the oil reservoir 45 described in the first embodiment, so that the lubricant recovery device according to the first embodiment can join the advantage by the lubricant overflow port 146, as in the case of the lubricant recovery device according to the second embodiment.

The invention claimed is:

1. A lubricant recovery device for the recovery of lubricant supplied together with carrier air as one of oil air lubrication and oil mist lubrication, the recovery device comprising:
   a vertical main spindle;
   a bearing that supports the main spindle and through which one of oil air lubrication and oil mist lubrication is passed, the bearing having a lower portion;
   a space formed below the bearing into which oil air lubrication or the oil mist lubrication passed through the bearing is discharged;
   an oil reservoir;
   a housing including:
      an air discharge passage extending vertically upwardly from the oil reservoir, the air discharge passage having a peripheral inner wall with lower and upper ends and an intermediate portion intermediate the lower and upper ends, wherein the lower end is valveless and opens into the oil reservoir, the upper end opens into the air outside the housing, and the intermediate portion has an opening through the peripheral inner wall, the peripheral inner wall providing a surface to which the lubricant in the oil air lubrication or the oil mist lubrication partly adheres and on which the lubricant liquefies, wherein the liquefied lubricant collects in the oil reservoir,
      a lubricant discharge passage extending vertically upwardly from the oil reservoir in parallel with the air discharge passage, the lubricant discharge passage having lower and an upper ends, the lower end opening into the oil reservoir, and
      a through hole which connects the lower portion of the bearing and the opening in the intermediate portion of the air discharge passage; and
   a suction unit connected to the upper end of the lubricant discharge passage for sucking the lubricant collected in the oil reservoir through the lubricant discharge passage such that the lubricant is recovered at a position outside the housing, wherein the air of the oil air lubrication or the oil mist lubrication passing through the bearing is discharged into air from the air discharge passage and the lubricant collected at the oil reservoir is sucked and recovered through the lubricant discharge passage.

2. The lubricant recovery device according to claim 1, wherein the air discharge passage is an air discharge hole extending outward with respect to the bearing in the vertical direction, and the lubricant discharge passage is a lubricant discharge hole extending vertically upward in parallel with the air discharge hole.

3. The lubricant recovery device according to claim 2, further comprising: a suction pipe inserted into the lubricant discharge hole, and wherein the suction pipe has a valveless, vertical bottom end located in the oil reservoir.

4. The lubricant recovery device according to claim 1, wherein the air discharge passage is an air discharge hole extending outward with respect to the bearing in the vertical direction, and the lubricant discharge passage is a lubricant discharge pipe inserted vertically upward into the air discharge hole and having a bottom end located in the oil reservoir.

5. The lubricant recovery device according claim 4, further comprising: a check valve provided in the lubricant discharge passage above the lower end thereof.

6. The lubricant recovery device according to claim 5, further comprising: a lubricant overflow port forming part of the oil reservoir.

7. The lubricant recovery device according to claim 1, further comprising: a lubricant overflow port forming part of the oil reservoir.

* * * * *